United States Patent [19]

Richeson

[11] 3,758,788

[45] Sept. 11, 1973

[54] CONVERSION SYSTEM FOR PROVIDING USEFUL ENERGY FROM WATER SURFACE MOTION

[76] Inventor: Dale T. Richeson, 1404 Kalaniiki St., Honolulu, Hawaii 96821

[22] Filed: June 14, 1971

[21] Appl. No.: 152,931

[52] U.S. Cl. ............... 290/42, 290/53, 290/1, 60/57, 417/332
[51] Int. Cl. ............................................ F03b 13/12
[58] Field of Search .................... 417/331, 332; 185/33; 60/57, 62, 9; 290/53, 54, 1, 42, 43

[56] References Cited
UNITED STATES PATENTS

| | | | |
|---|---|---|---|
| 3,603,804 | 9/1971 | Lasey | 417/332 |
| 1,078,323 | 11/1913 | Trull | 417/332 |
| 2,848,189 | 8/1958 | Caloia | 417/332 X |
| 1,604,632 | 10/1926 | Carter | 417/332 |
| 2,754,805 | 7/1956 | Beman | 60/57 |
| 3,569,725 | 3/1971 | Rosenberg | 290/53 |
| 3,204,110 | 8/1965 | Masuda | 290/4 R |

Primary Examiner—G. R. Simmons
Attorney—Nilsson, Robbins, Wills & Berliner

[57] ABSTRACT

An energy-conversion system is disclosed for converting water surface movement, e.g. wave motion, to useful energy. Buoyant structures are provided defining pairs of opposed surfaces affixed together by pivotal structures with energy means, e.g. bellows, held spaced-apart from the pivot means. In the disclosed embodiment, the bellows are actuated with displacements between the buoyant structures, to develop positive fluid pressures to accomplish various operations. As disclosed, a turbine is driven to motivate an electrical generator for providing electrical power through a conductor to an electrical load.

6 Claims, 5 Drawing Figures

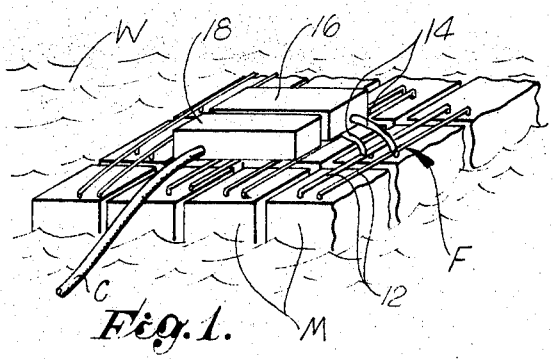
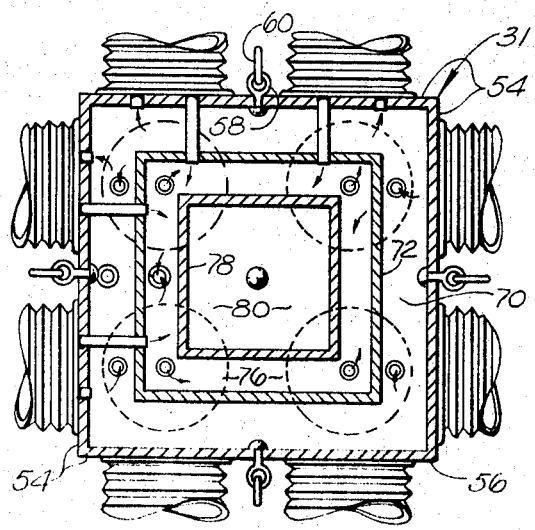
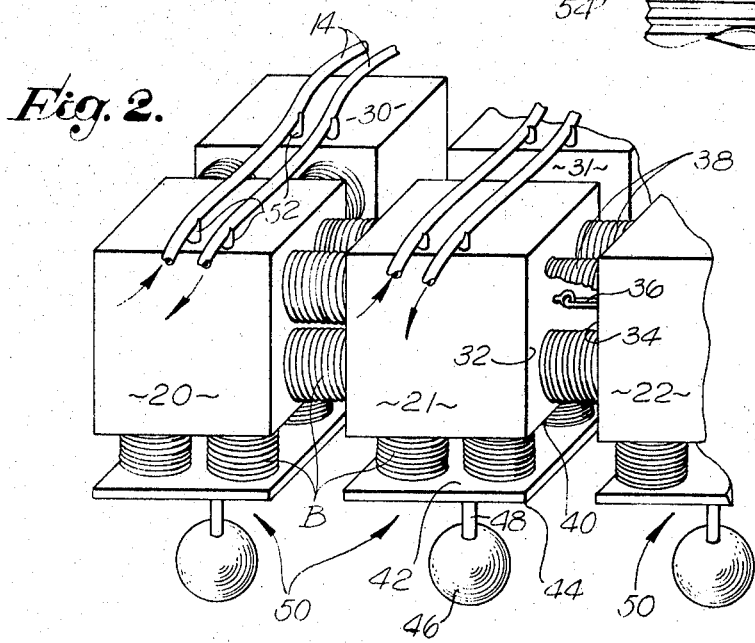
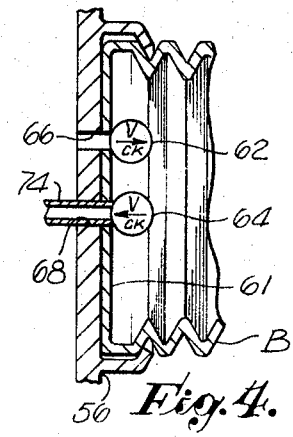
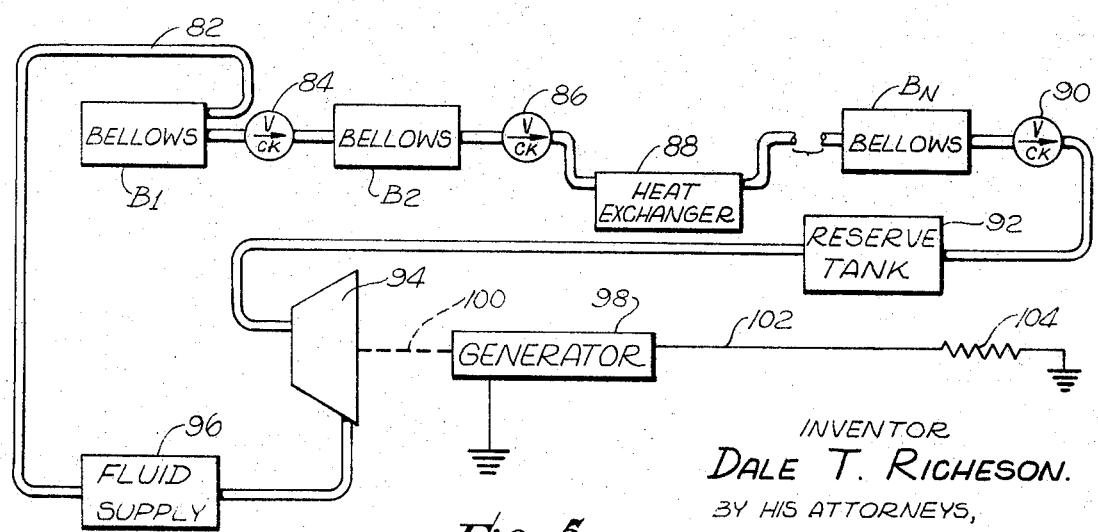
Fig. 1.
Fig. 3.
Fig. 2.
Fig. 4.
Fig. 5.
INVENTOR
DALE T. RICHESON.
BY HIS ATTORNEYS,
NILSSON, ROBBINS, WILLS & BERLINER.

CONVERSION SYSTEM FOR PROVIDING USEFUL ENERGY FROM WATER SURFACE MOTION

BACKGROUND AND SUMMARY OF THE INVENTION

Man has long recognized the vast power and energy content of water-surface motion, as on the sea, and has sought to convert such energy into a useful form. For example, systems have been proposed incorporating floats that are raised and lowered by surface irregularities to provide useful energy. Other proposed structures have utilized the variation in hydraulic head as applied to a subsurface structure to provide useful energy. For example, as the quantity of water above a submerged unit varies, a diaphragm may be actuated by the varying pressure head to accomplish useful energy. Still another class of such apparatus have been proposed for operation by random surface motion; for example, it has been proposed to provide a pendulum inside a float which would be ratcheted to provide useful energy.

Generally, previously-proposed structures of the type under consideration have not come into widespread use for a number of specific reasons. First, one considerable problem has involved the cost of installing previous structures as well as the risk of loss attendant their use in the event of turbulent waters. Generally, forms of systems required to be moored, as to the ocean floor, tend to present specific problems with regard to installation and maintenance. Of course, in evaluating prior structures, their effectiveness to provide any substantial amounts of power in relation to costs of installation and maintenance has been a seriously limiting consideration. As a consequence, although the need has long been recognized for a practical system for converting water surface deviations to a useful form of energy, such structures, as previously proposed, have not experienced particularly extensive or widespread use.

In general, the present invention contemplates a device for converting the random motion at the surface of a body of water to a usable form of energy as to compress fluid, displace fluid or provide electrical energy. The system may be somewhat modular incorporating a varying number of individual structures depending upon the power requirements and the particular application.

Essentially, the modular units provide opposed surfaces which are pivotally interconnected whereby the relative motions between different portions of the surfaces tend to be reciprocal. Bellows or other reciprocally activated structures are mounted between the surfaces to provide useful energy. For example, the energy may be expended by pumping surface water to the ocean depths for the stimulation of organic growth. Somewhat similarly, other fluids, e.g. air, may be pumped to the depths of bodies of fresh water, as to combat pollution or inhibit ice formations. Furthermore, the system also may be utilized, as disclosed herein, to develop electrical energy which may be transmitted to a remote location for utilization. As still another example, the system may be utilized to provide power for use in remote installations at sea, such as weather and oceanographic research stations. Thus, specific applications for the system are numerous; however, such applications will be readily apparent to persons skilled in the art in view of the detailed embodiments set forth below.

BRIEF DESCRIPTION OF THE DRAWINGS

In the drawings, which constitute a part of this specification, exemplary embodiments demonstrating various objectives and features hereof are set forth as follows:

FIG. 1 is a perspective fragmentary view of a structure constructed in accordance with the present invention;

FIG. 2 is an enlarged fragmentary view of the structure of FIG. 1 showing a portion thereof out of water;

FIG. 3 is a horizontal sectional view taken through a modular unit of the structure of FIG. 1;

FIG. 4 is a fragmentary view of a bellows as incorporated in the structure of FIG. 1; and FIG. 5 is a system diagram schematically illustrating the operation of the structure of FIG. 1.

DESCRIPTION OF THE ILLUSTRATIVE EMBODIMENT

As required, a detailed illustrative embodiment along with certain variations thereof is disclosed herein. However, it is to be understood that the embodiment merely exemplifies the invention, which may take many forms that are radically different from the specific illustrative embodiment as disclosed herein. Therefore, specific structural and functional details disclosed herein are not to be interpreted as limiting but merely as a basis for the claims defining the scope and content of the invention.

Referring initially to FIG. 1, a fragment F of a total apparatus in accordance herewith is shown floating upon a body of water W. The fragment F (as the total apparatus) is somewhat modular in form and in that regard, the total apparatus may be of vast proportions. However, as disclosed herein, individual modules may be simply multiplied in number to attain design objectives.

Generally, surface motion of the water W causes individual floatation members M to vary their positions with respect to each other which positional changes are utilized to develop useful energy as disclosed in detail herein. Specifically, energy may be provided in the form of electrical current through a conductive channel C as for utilization at a remote location. Thus, the system, comprising widely varying numbers of individual floatation members may be placed in any of a wide variety of different locations for providing useful energy in a manner as will be described in detail below.

A composite of individual floatation members M may be provided as various structures, e.g. rafts, bridges, channel markers, and so on. Similarly, the structures may be moored, otherwise confined, or as in the case of experimental installations may be permitted to drift and thereby follow tide patterns and ocean currents. Accordingly, it is to be appreciated that the specific configuration embodying the floatation members as disclosed is subject to a large number of possibilities.

The individual floatation members are mechanically interconnected, as described in detail below, and additionally are interconnected by flexible, pressure tubes or hoses 12. The individual hoses 12 are in turn connected through manifold pressure hoses 14 to a housing 16. The housing 16 may contain a variety of operating equipments, one form of which is disclosed in detail below. Specifically, for example, the housing 16 may contain a turbine for actuating a generator contained in a housing 18 for supplying electrical power through the conduction channel C. Of course, as indicated above, the housings 16 and 18 may comprise various other structures including reservoirs for storage of operating fluids (gas or liquid) which is pressurized for various uses.

Considering the operation of the system in somewhat greater detail, a sub-fragment of the structure depicted in FIG. 1 is illustrated out of the water W in FIG. 2; specifically, individual floatation units 20, 21, 22, 30 and 31 are illustrated. In general, each of the floatation units is similar to the others excepting different numbers of couplings are provided to accommodate different composite shapes. That is, a different number of bellows B is provided depending upon configurational position of a module. Specifically, peripheral or outboard units receive a lesser number of bellows B because bellows are provided only between the opposed surfaces of adjacent floatation units and on the bottom surface. For example, the surface 32 on the unit 21 faces a surface 34 (not shown) in opposing relationship. At central locations, the surfaces 32 and 34 are interconnected by a universally pivotal linkage 36, i.e. two ring studs and a link. Additionally, a set of four bellows 38 are fixed between the opposed surfaces 32 and 34, with the axes of the generally-cylindrical bellows being substantially parallel and defining the corners of a square.

Somewhat similarly to the vertical surface structures, as described above, the bottom surface 40 of the unit 21 is in faced opposing relationship with the upper surface 42 of a plate 44 and these two horizontal surfaces are interconnected by a linkage (not shown) and a set of bellows B. The lower side of the plate 44 carries a rigidly-affixed pendulum 46 supported on a solid rod 48. Thus, an integral, bottom operating structure 50 is provided for each of the floatation units.

As indicated with reference to FIG. 1, the floatation units are interconnected by hoses 14. More specifically, each pair of hoses 14 traverses a group of floatation units to which each is connected through stub tube connections 52. As disclosed in detail below, a pressure differential is developed across the hoses in each pair in the form of useful energy.

Considering the internal structure of the floatation units in somewhat greater detail, reference will now be made to FIG. 3 showing an inboard unit, e.g. unit 31, in horizontal section. Of course, as indicated above, it is to be noted that the units are generally similar except for the number of bellows connected thereto.

The operating surfaces 54 of the unit 31 are defined by a parallelepiped closed-box housing 56. At a central location on each of the vertical walls defining the surfaces 54 (and at the bottom), a connection ring 58 is attached. An elongate link 60 affixed to each pair of rings 58 affords a pivotal central connection between opposing surfaces. As indicated above, each of the opposed surfaces is also connected to the ends of a set of four bellows B.

As illustrated in FIG. 4, each of the bellows B incorporates a pair of opposed check valves 62 and 64 which are matingly aligned with ports 66 and 68, respectively, in the housing 56. The port 66 of each bellows communicates with a parallelepiped space 70 (FIG. 3) which is defined by the housing 56 and a smaller box housing 72 that is matingly received within the housing 56. The ports 68 (FIG. 4) are connected through ducts 74 to an internal space 76 (FIG. 3) defined between the housing 78 and the housing 72.

Recapitulating, with concurrent reference to FIGS. 3 and 4, it is to be understood that each of the bellows B is connected to receive low-pressure fluid from the space 70 through a port 66 and a check valve 62, and to exhaust higher-pressure fluid through a port 68 and a duct 74 into the space 76. The central space 80 (FIG. 3) inside the housing 78 may be variously utilized as, for example, a storage capacity for pressurized fluid or, alternatively, simply as a floatation compartment.

Of course, various materials may be employed in the fabrication of structures in accordance herewith, depending upon many considerations. However, in one form substantially as disclosed, steel may be used and covered with a corrosion-resistant coating. Bellows may be formed of synthetic materials, along with interconnecting hose structures.

In the operation of the system, the varying surface of the water W (FIG. 1) which supports the composite structure causes the individual members M to pivot and swing with respect to each other. The swinging or pivotal motion is controlled by the linkages 36 so that the opposed surfaces of adjacent members M that are interconnected by individual bellows B (FIG. 2) move in a reciprocating pattern. Of course, the speed and displacement of the reciprocating motion patterns may vary widely; however, the results are invariably the same in alternately compressing and elongating the individual bellows B. As a bellows B is elongated, a charge of fluid is drawn in through the port 66 and the check valve 62. Subsequently, as the bellows B is collapsed, the check valve 62 closes resulting in the development of elevated pressure within the bellows B which actuates the check valve 64 so that the fluid is exhausted at a higher pressure through the check valve 64 and the duct 74. In that manner, useful energy in the form of compressed or high-pressure fluid is provided.

As indicated above, the use of the energy provided by the system may vary widely in numerous applications. However, an indicated exemplary use for the energy involved conversion to electrical form. FIG. 5 illustrates such a system.

As depicted in FIG. 5, a series of bellows B1, B2, and BN may each consist of one or a connected plurality of individual bellows B as described above. Thus, the bellows B1, B2, and BN are essentially pressurizing units utilizing the structure as described above. The bellows B1 receives fluid through an intake line 82 and exhausts the fluid at an elevated pressure through a check valve 84 (symbolically represented) to the intake of the bellows B2. Somewhat similarly, the bellows B2 exhausts through a check valve 86 to eventually supply the bellows BN. As indicated, the serial chain of bellows may incorporate heat exchangers 88 which may be immersed in the water W and may serve to cool the pressurized fluid subsequent to compression.

The final bellows BN in the series exhausts through a check valve 90 to a reserve tank 92 which supplies drive fluid to a turbine 94 that exhausts through a fluid supply apparatus 96 to supply the low-pressure line 82. Thus, the system incorporates a closed-circuit power loop which may involve phase transitions in the working fluid.

The mechanical energy provided from the turbine 94 drives a generator 98 as indicated by a dashed line 100 representing a mechanical connection. The generator 98 is connected to electrical ground potential, e.g. ocean water, and supplies current at an elevated potential through a conductor 102 to an electrical load 104.

As indicated above, the system hereof may be embodied in a wide variety of different specific forms, some of which have been suggested or specifically mentioned. However, in that regard, the scope hereof is defined by the claims as follow.

What is claimed is:

1. A conversion system for providing useful energy from water surface motion, comprising:
   a plurality of buoyant means defining pairs of opposed surfaces;
   a plurality of pivot means fastening said opposed surfaces together, for allowing said surfaces to swing about said pivot means in two dimensions;
   a plurality of bellows means affixed between said opposed surfaces at locations spaced apart from said pivot means; and
   energy accumulation means connected to said flexure means for providing useful energy from said flexure means.

2. A conversion system according to claim 1 wherein said energy accumulation means includes valve means interconnecting said bellows for controlling the flow therein to accumulate a positive pressure head.

3. A conversion system according to claim 1 including buoyant means affixed together to extend in two dimensions.

4. A conversion system according to claim 3 wherein said energy accumulation means includes valve means interconnecting said bellows means for controlling the flow therein to accumulate a positive pressure head.

5. A conversion system according to claim 1 further including a plurality of pendulum means, affixed to said buoyant means.

6. A conversion system according to claim 5 including buoyant means affixed together to extend in two dimensions.

* * * * *